(12) United States Patent
Gray et al.

(10) Patent No.: US 10,029,798 B2
(45) Date of Patent: Jul. 24, 2018

(54) STRUCTURE AND METHOD FOR REDUCING AIR FLOW IN A WALL VOLUME OF AN AIRCRAFT

(71) Applicant: The Boeing Company, Chicago, IL (US)

(72) Inventors: John C. Gray, Merritt Island, FL (US); Roger B. Black, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 14/616,885

(22) Filed: Feb. 9, 2015

(65) Prior Publication Data

US 2015/0274304 A1 Oct. 1, 2015

Related U.S. Application Data

(63) Continuation-in-part of application No. 14/230,348, filed on Mar. 31, 2014.

(51) Int. Cl.
| | | |
|---|---|---|
| *B64D 13/02* | (2006.01) | |
| *B64C 1/10* | (2006.01) | |
| *B64C 1/18* | (2006.01) | |
| *B64C 1/40* | (2006.01) | |
| *B64D 11/04* | (2006.01) | |
| *B64D 45/00* | (2006.01) | |
| *B64C 1/06* | (2006.01) | |

(52) U.S. Cl.
CPC .............. *B64D 13/02* (2013.01); *B64C 1/066* (2013.01); *B64C 1/10* (2013.01); *B64C 1/18* (2013.01); *B64C 1/40* (2013.01); *B64D 11/04* (2013.01); *B64D 45/00* (2013.01); *B64D 2045/009* (2013.01); *Y10T 29/49826* (2015.01)

(58) Field of Classification Search
CPC .. B64C 1/066; B64C 1/10; B64C 1/18; B64D 2045/009
USPC ......................................................... 244/119
See application file for complete search history.

(56) References Cited

U.S. PATENT DOCUMENTS

| | | | |
|---|---|---|---|
| 4,383,666 A * | 5/1983 | Allerding .................. | B64C 1/18 244/118.5 |
| 4,432,514 A | 2/1984 | Brandon | |
| 4,646,993 A * | 3/1987 | Baetke ...................... | B64C 1/18 244/117 R |
| RE32,554 E | 12/1987 | Murphy | |

(Continued)

FOREIGN PATENT DOCUMENTS

| | | |
|---|---|---|
| WO | WO 00/37313 | 6/2000 |
| WO | WO2002/016818 | 11/2002 |
| WO | WO 2008/109711 | 9/2008 |

OTHER PUBLICATIONS

Extended European Search Report, EP 15 16 0751 (dated 2015).

(Continued)

*Primary Examiner* — Brian M O'Hara
*Assistant Examiner* — Keith L Dixon
(74) *Attorney, Agent, or Firm* — Walters & Wasylyna LLC

(57) ABSTRACT

An aircraft including a fuselage defining an upper lobe and a lower lobe, the fuselage including a wall structure that includes an outboard boundary and an inboard boundary spaced from the outboard boundary, wherein the outboard boundary and the inboard boundary define a wall volume therebetween, and a barrier sheeting member extending into the wall volume.

18 Claims, 6 Drawing Sheets

(56) References Cited

U.S. PATENT DOCUMENTS

| | | | | |
|---|---|---|---|---|
| 5,871,178 | A * | 2/1999 | Barnett | B64C 1/18 244/118.5 |
| 6,491,254 | B1 | 12/2002 | Walkinshaw et al. | |
| 6,585,189 | B1 * | 7/2003 | Smallhorn | B64C 1/18 244/118.5 |
| 8,167,231 | B2 * | 5/2012 | Leisten | B64C 1/18 244/1 A |
| 8,490,922 | B2 * | 7/2013 | Benthien | F16B 4/004 244/119 |
| 8,567,721 | B2 * | 10/2013 | Voss | B64C 1/18 244/118.5 |
| 9,022,321 | B2 * | 5/2015 | Vogt | B64C 1/066 244/129.4 |
| 2012/0043421 | A1 * | 2/2012 | Voss | B64C 1/18 244/118.5 |
| 2012/0156979 | A1 | 6/2012 | Gray et al. | |

OTHER PUBLICATIONS

Canadian Intellectual Property Office, Examination Report, CA 2,883,992 (dated Feb. 10, 2016).
European Patent Office, Communication pursuant to Article 94(3) EPC, EP 15 160 751.2 (dated Jan. 15, 2018).
Chinese Patent Office, First Office Action, Application No. 201510146377.2, (dated Apr. 4, 2018).
English Translation, Chinese Patent Office, First Office Action, Application No. 201510146377.2, (dated Apr. 4, 2018).

* cited by examiner

STRUCTURE AND METHOD FOR REDUCING AIR FLOW IN A WALL VOLUME OF AN AIRCRAFT

PRIORITY

This application is a continuation-in-part of U.S. Ser. No. 14/230,348 filed on Mar. 31, 2014, the entire contents of which are incorporated herein by reference.

FIELD

This application relates to aircraft and, more particularly, to air flow within the wall volume of an aircraft.

BACKGROUND

Modern fixed wing commercial transport aircraft share features in common with their predecessors, including wings, a fuselage, control surfaces and engines. Continuous advancement in aerodynamics, materials, engine power and efficiency, and component design contribute to faster, safer air travel. However, the generally cylindrical fuselage has remained a fairly consistent and recognizable feature of commercial aircraft.

An aircraft fuselage is typically divided into separate volumes. In many instances, passengers sit in a volume referred to as the passenger cabin. The passenger cabin is often separated from volumes below the passenger cabin in which cargo is carried, in which airplane mechanical and electrical systems are located, and through which air flows. The cargo volumes may be axially separated by the wing box and main landing gear bay into the forward and aft cargo compartments. The combination of the passenger cabin and crown volumes is commonly referred to as the upper lobe, while the combination of the cargo compartments, bilge, left and right cheeks, and floor beam volumes is commonly referred to as the lower lobe.

Conditioned air is provided to the passenger volume to pressurize the airplane fuselage and control temperature, contaminants and odors. The majority of the air (air not transported directly to the lower lobe by the air moving system) must flow from the upper lobe to the lower lobe of the fuselage where it can either be recirculated back to the passenger cabin or be released to the ambient atmosphere from which it was originally drawn. Transport of air flow from the upper to lower lobes is intended to occur through return air grilles located near the interface of the floor and passenger cabin sidewalls.

"Sidewall air flow" or "SWF" is a term used to describe unintended air flow from an aircraft upper lobe to lower lobe via unintended paths. These unintended air flow paths include, but are not limited to, the sidewall cavity between the airplane skin and the passenger cabin sidewall liner panel and the volume between the aft pressure bulkhead and the aft cabin galley endwall. This air leakage may impact performance of aircraft systems, including impacting the passenger cabin Return Air Grille (RAG) air velocity, which affects the smoke penetration performance during a cargo fire event, the thermal performance of the Cabin Air Conditioning and Temperature Control System (CACTCS), the ability of the ECS subsystem to prevent smoke and odor migration, such as that discharged by the Lavatory and Galley Ventilation (LGV) subsystem below the cabin floor, into the passenger cabin, the pressure differential and resultant air flow direction between the Flight Deck (FD) and passenger cabin, and the efficiency with which the Air Distribution (AD) subsystem ventilates the passenger cabin.

It has been supposed that the various components housed in the space within the fuselage wall structure, i.e. the "wall volume," that are often packed quite tightly, sufficiently obstructed air flow within the wall volume. However, despite the presence of tightly packed wall volume components within the wall volume, undesired air flow within the wall volume continues to occur.

Accordingly, those skilled in the art continue with research and development efforts aimed at reducing air leakage beyond intended air flow paths in an aircraft.

SUMMARY

In one embodiment, the disclosed aircraft may include a fuselage defining an upper lobe and a lower lobe, the fuselage including a wall structure that includes an outboard boundary and an inboard boundary spaced from the outboard boundary, wherein the outboard boundary and the inboard boundary define a wall volume therebetween, and a barrier sheeting member extending into the wall volume.

In another embodiment, disclosed is method for reducing air flow in an aircraft. The aircraft includes a fuselage defining an upper lobe and a lower lobe, wherein the upper lobe is separated from the lower lobe by a floor beam. The fuselage includes a wall structure that includes an outboard boundary and an inboard boundary spaced from the outboard boundary, wherein the outboard boundary and the inboard boundary define a wall volume therebetween. The method includes steps of (1) providing a barrier sheeting member and (2) positioning the barrier sheeting member such that a portion of the barrier sheeting member extends along at least a portion of the floor beam and an end portion of the barrier sheeting member extends into the wall volume.

Other embodiments of the disclosed structure and method for reducing air flow in a wall volume of an aircraft will become apparent from the following detailed description, the accompanying drawings and the appended claims.

DETAILED DESCRIPTION

Figure 1:
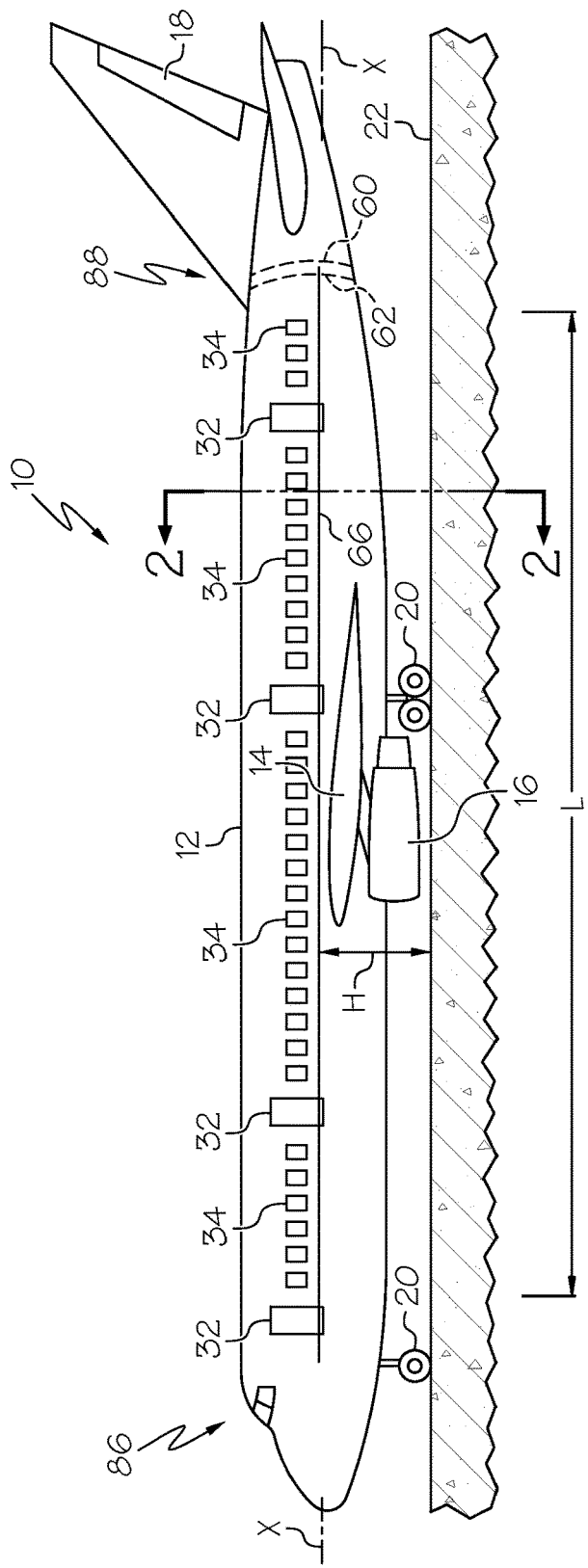
FIG. 1 is a schematic side elevational view of an aircraft in accordance with an embodiment of the present disclosure.

Referring to FIG. 1, the disclosed aircraft, generally designated 10, may include a fuselage 12, wings 14, engines 16 and various control surfaces 18. Wheels 20 (or other motion facilitating devices) may facilitate takeoff and landing of the aircraft 10, as well as taxiing along the tarmac 22.

Of course, the aircraft 10 may include various additional components and systems, such as an environmental system, navigational systems, electrical systems and hydraulic systems, as are known in the art.

Figure 2:
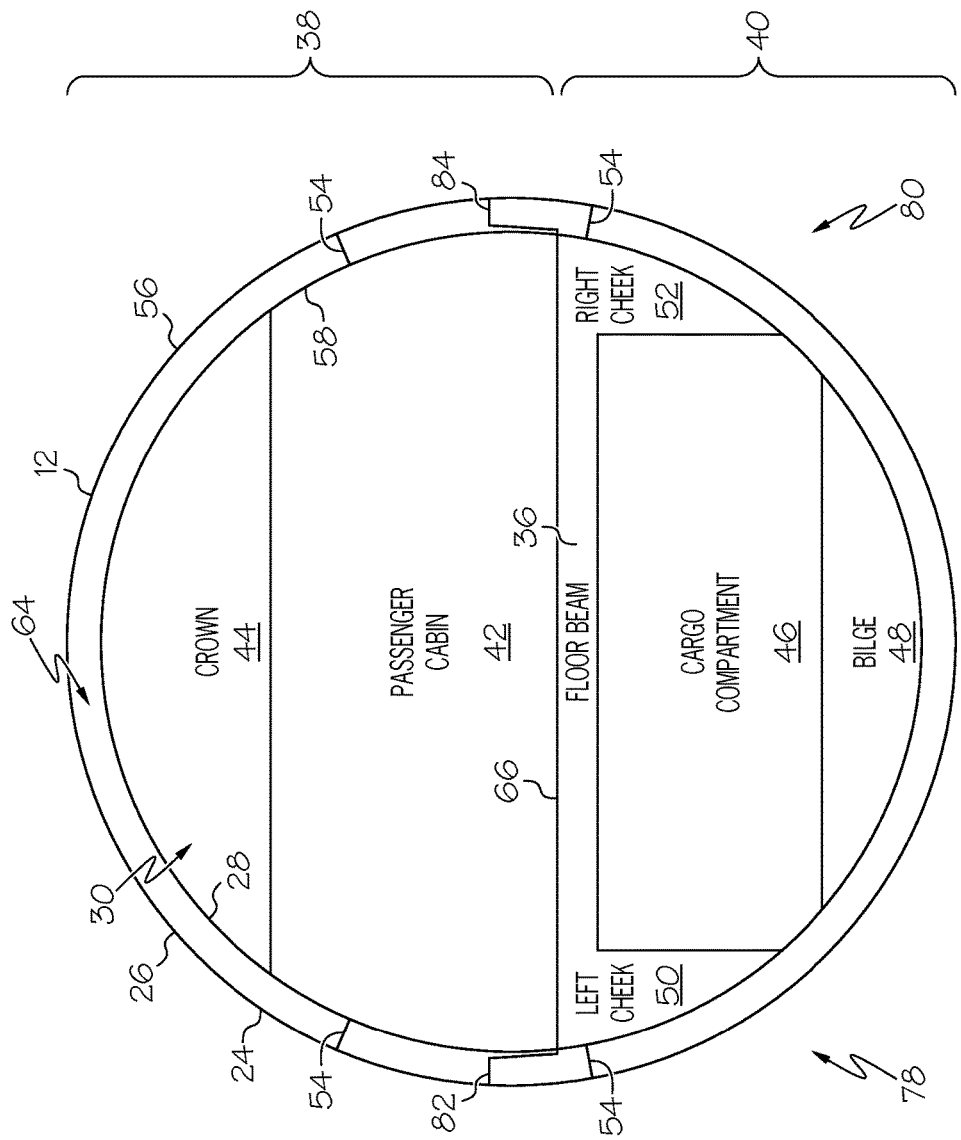
FIG. 2 is an axial cross-sectional view of a fuselage of the aircraft of FIG. 1 taken coincident with a cargo compartment.

The fuselage 12 may extend along a longitudinal axis X of the aircraft 10. As shown in FIG. 2, the fuselage 12 may include a wall structure 24 having an outboard boundary 26 and an inboard boundary 28. The outboard boundary 26 may define a fuselage volume 30 (the entire volume within the outboard boundary 26). One or more doors 32 (FIG. 1) may optionally be formed in the wall structure 24 of the fuselage 12 to provide access to the fuselage volume 30. Windows 34 (FIG. 1) may also be included to provide a view through the wall structure 24 of the fuselage 12.

Referring to FIG. 2, a floor beam 36 may divide the fuselage volume 30 into an upper lobe 38 and a lower lobe 40. The upper lobe 38 may include a passenger cabin 42 and, optionally, one or more additional compartments, such as a crown 44. The lower lobe 40 may include a cargo compartment 46 and, optionally, one or more additional compartments, such as a bilge 48, a left cheek 50 and a right cheek 52.

The wall structure 24 of the fuselage 12 may include the outboard boundary 26, the inboard boundary 28 and, optionally, structural members 54. The structural members 54 may form the frame of the fuselage 12.

In one expression, the outboard boundary 26 of the wall structure 24 may be the skin 56 of the fuselage 12. Therefore, the passenger cabin sidewall 58 may form at least a portion of the inboard boundary 28 of the wall structure 24.

In another expression, the outboard boundary 26 of the wall structure 24 may be the aft pressure bulkhead 60 (FIG. 1) of the fuselage 12. Therefore, the passenger cabin sidewall 58 and/or the aft cabin galley endwall 62 may form at least a portion of the inboard boundary 28 of the wall structure 24.

In yet another expression, the outboard boundary 26 of the wall structure 24 may include both the skin 56 (FIG. 2) of the fuselage 12 and the aft pressure bulkhead 60 (FIG. 1) of the fuselage 12. Therefore, the inboard boundary 28 of the wall structure 24 may include both the passenger cabin sidewall 58 and the aft cabin galley endwall 62.

Figure 3:
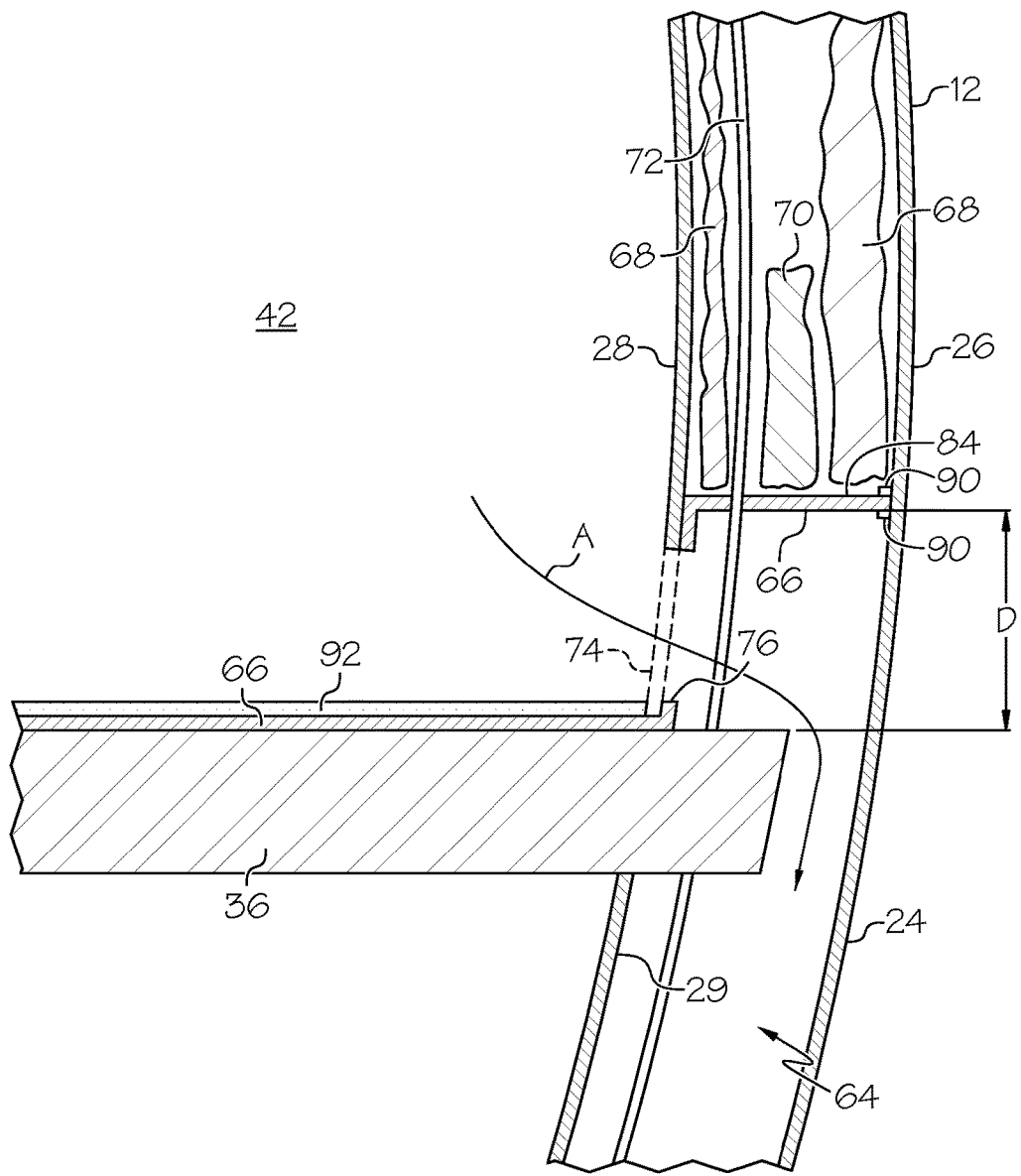
FIG. 3 is a detailed view of a portion of the fuselage of FIG. 2, showing a barrier sheeting member extending into the wall volume defined by the wall structure of the fuselage.

The inboard boundary 28 of the wall structure 24 of the fuselage 12 may be inwardly spaced from the outboard boundary 26 to define a wall volume 64 therebetween. As shown in FIG. 3, the wall volume 64 of the wall structure 24 of the fuselage 12 may house various wall volume components, such as insulation 68 (e.g., insulation blankets), fire barriers 70 and transport elements 72 (e.g., ducts, pipes, hoses, tubes, wires, harnesses etc.). Nonetheless, an uncontrolled air flow between the upper lobe 38 and the lower lobe 40 typically exists within the wall volume 64 of conventional aircraft. By incorporating a barrier sheeting member 66 that extends into the wall structure 24 of the fuselage 12, unintended and undesired air flow within the wall volume 64 may be significantly reduced (if not eliminated), thereby promoting desired air flow.

Referring to FIG. 3, desired air flow may be air flow from the passenger cabin 42 of the upper lobe 38 (FIG. 2), through the return air grille 74 into the wall volume 64, and then down to the lower lobe 40 (FIG. 2) by way of the wall volume 64, as shown by arrow A. To effect the desired air flow, the return air grille 74 may be located proximate the transition between the upper lobe 38 and the lower lobe 40, such as just above the floor beam 36. An opening 76 may be formed in the barrier sheeting member 66 and aligned with the return air grille 74 to accommodate desired air flow through the return air grille 74 (bypassing the barrier sheeting member 66). Therefore, the return air grille 74 may fluidly couple the upper lobe 38 with the lower lobe 40.

As shown in FIGS. 2 and 3, the barrier sheeting member 66 may laterally extend across the fuselage 12 from a first (e.g., port) side 78 (FIG. 2) of the fuselage 12 to a second (e.g., starboard) side 80 (FIG. 2) of the fuselage 12 laterally opposed from the first side 78. For example, the barrier sheeting member 66 may be laid over the floor beam 36, and may include a first end portion 82 laterally opposed from a second end portion 84. The first end portion 82 of the barrier sheeting member 66 may extend into the wall volume 64 on the first side 78 of the fuselage 12 and the second end portion 84 of the barrier sheeting member 66 may extend into the wall volume 64 on the second side 80 of the fuselage 12. Therefore, the barrier sheeting member 66 may form a substantially continuous barrier between the upper lobe 38 and the lower lobe 40.

As best shown in FIG. 3, inside the wall volume 64 of the wall structure 24, the barrier sheeting member 66 may extend from proximate (at or near) the inboard boundary 28 to proximate the outboard boundary 26, thereby effectively sealing the wall volume 64 to prevent sidewall air flow. To accommodate the return air grille 74, the end portions 82, 84 (only end portion 84 is shown in FIG. 3) of the barrier sheeting member 66 may be raised a distance D above the floor beam 36 to allow the openings 76 in the barrier sheeting member 66 to align with the return air grilles 74 (only one opening 76 and one return air grille 74 are shown in FIG. 3). For example, the barrier sheeting member 66 may run horizontally along the floor beam 36. Then, at the wall structure 24, the barrier sheeting member 66 may run from the floor beam 36, upward along the inside 29 (or, alternatively, the outside) of the inboard boundary 28 of the wall structure 24, and then laterally outward toward the outboard boundary 26 of the wall structure 24.

Referring back to FIG. 1, the barrier sheeting member 66 may axially extend along at least a portion of the longitudinal length L of the fuselage 12. For example, the barrier sheeting member 66 may continuously extend from proximate the forward end 86 of the fuselage 12 to proximate the aft end 88 of the fuselage 12. Alternatively, the barrier sheeting member 66 may axially extend as a plurality of segments.

In one particular construction, the barrier sheeting member 66 may be present in the wall structure 24 (FIG. 2) at a pre-determined and fixed height H (e.g., a constant waterline above the tarmac 22). Therefore, regardless of the axial position along the longitudinal axis X, the height H of the barrier sheeting member 66 may be constant, thereby enabling maintenance crews to quickly locate and access the barrier sheeting member 66 should the need arise. In alternative expressions, the fixed height H can differ for different segments, or other different portions, of the longitudinal axis X.

The barrier sheeting member 66 may substantially continuously extend both laterally and longitudinally across the fuselage 12. However, as noted above, an opening 76 may be formed in the barrier sheeting member 66 to accommodate the return air grille 74. Additional openings may also be formed in the barrier sheeting member 66 to allow various components of the aircraft 10 to bypass the barrier sheeting member 66. As one example, openings may be formed in the barrier sheeting member 66 to accommodate passage of transport elements 72, such as ducts, conduits, wires, hoses, pipes, tubes and the like, notwithstanding the presence of the barrier sheeting member 66. As another example, openings may be formed in the barrier sheeting member 66 to accommodate fasteners, such as fasteners (e.g., bolts) used to secure passenger seats (not shown) to the floor beam 36. Various sealants may be used to seal such openings.

While the barrier sheeting member 66 is described as substantially continuously extending both laterally and longitudinally across the fuselage 12, the barrier sheeting member 66 need not necessarily be monolithic. Rather, the barrier sheeting member 66 may be comprised of multiple pieces of material that have been connected together (e.g., along seams). Those skilled in the art will appreciate that it may be advantageous to minimize the number of seams and to properly seal any seams with an adhesive, such as flexible sealant/tape.

The barrier sheeting member 66 may be connected to the outboard boundary 26, to the inboard boundary 28 and/or to the floor beam 36. Connection between the barrier sheeting member 66 and other structures may be effected with adhesives (e.g., glues, creams, gels, tapes and the like), mechanical fasteners or the like. For example, as best shown in FIG. 3, the end portions 82, 84 (only end portion 84 is shown in FIG. 3) of the barrier sheeting member 66 may be connected to the outboard boundary 26 of the wall structure 24 using a flexible sealant 90, such as GORE™ SKY-FLEX™ tape, commercially available from W. L. Gore & Associates of Newark, Del.

As noted above, the barrier sheeting member 66 may run horizontally along the floor beam 36. Therefore, a surface layer 92 (FIG. 3) may be placed over the barrier sheeting member 66 such that the barrier sheeting member 66 is positioned between the floor beam 36 and the surface layer 92. The surface layer 92 may protect the underlying barrier sheeting member 66 from wear and tear, and may also be decorative. For example, the surface layer 92 may be (or may include) carpet, laminate flooring, tile or the like.

While the barrier sheeting member 66 is shown and described lying over the floor beam 36, alternative configurations are contemplated and will not result in a departure from the scope of the present disclosure. As one alternative example, the barrier sheeting member 66 may be secured below the floor beam 36. As another alternative example, the barrier sheeting member 66 may be incorporated into the floor beam 36. For example, the floor beam 36 may be constructed as a layered structure, with the barrier sheeting member 66 forming one layer of the layered structure.

The barrier sheeting member 66 may be any film, membrane or other sheeting structure formed from a barrier material suitable for inhibiting air flow across the barrier sheeting member 66. Depending on composition, the barrier sheeting member 66 may have a cross-sectional thickness ranging from about 0.5 mil to about 50 mil, such as from about 1 mil to about 20 mil or from about 2 mil to about 10 mil, wherein 1 mil equals one thousandth of an inch.

Various materials (or combinations of materials) may be used to form the barrier sheeting member 66. Appropriate material selection may yield a barrier sheeting material 66 that inhibits (if not fully eliminates) air flow across the barrier sheeting material 66. Those skilled in the art will appreciate that the barrier sheeting material 66 may effectively inhibit air flow even though the barrier sheeting material 66 is not absolutely impervious to air (e.g., air diffusion through the barrier sheeting material 66 may be acceptable so long as bulk air flow is inhibited).

In one implementation, the barrier sheeting member 66 may be formed from (or may include) one or more polymeric materials. One general non-limiting example of a polymeric material suitable for use in connection with the barrier sheeting member 66 is plastic sheeting. One specific non-limiting example of a polymeric material suitable for use in connection with the barrier sheeting member 66 is polyethylene sheeting. Various other polymeric materials may also be used.

In another implementation, the barrier sheeting member 66 may be formed from (or may include) one or more metallic materials. One non-limiting example of a metallic material suitable for use in connection with the barrier sheeting member 66 is aluminum (e.g., aluminum foil). Another non-limiting example of a metallic material suitable for use in connection with the barrier sheeting member 66 is metallized plastic film (e.g., metallized oriented polypropylene or metallized polyethylene terephthalate). Yet another non-limiting example of a metallic material suitable for use in connection with the barrier sheeting member 66 is paper-backed metal film (e.g., paper-backed aluminum).

Because the barrier sheeting member 66 is being incorporated into an aircraft 10, material selection considerations may include flame resistance and out-gassing properties. Therefore, aerospace-rated materials may be used as the barrier sheeting member 66. As one specific, non-limiting example, the barrier sheeting member 66 may be an aerospace-rated cargo liner material, such as Gillfab™ 1367A/C cargo liner material (a fiberglass reinforced phenolic laminate) commercially available from The Gill Corporation of El Monte, Calif.

Figure 4:
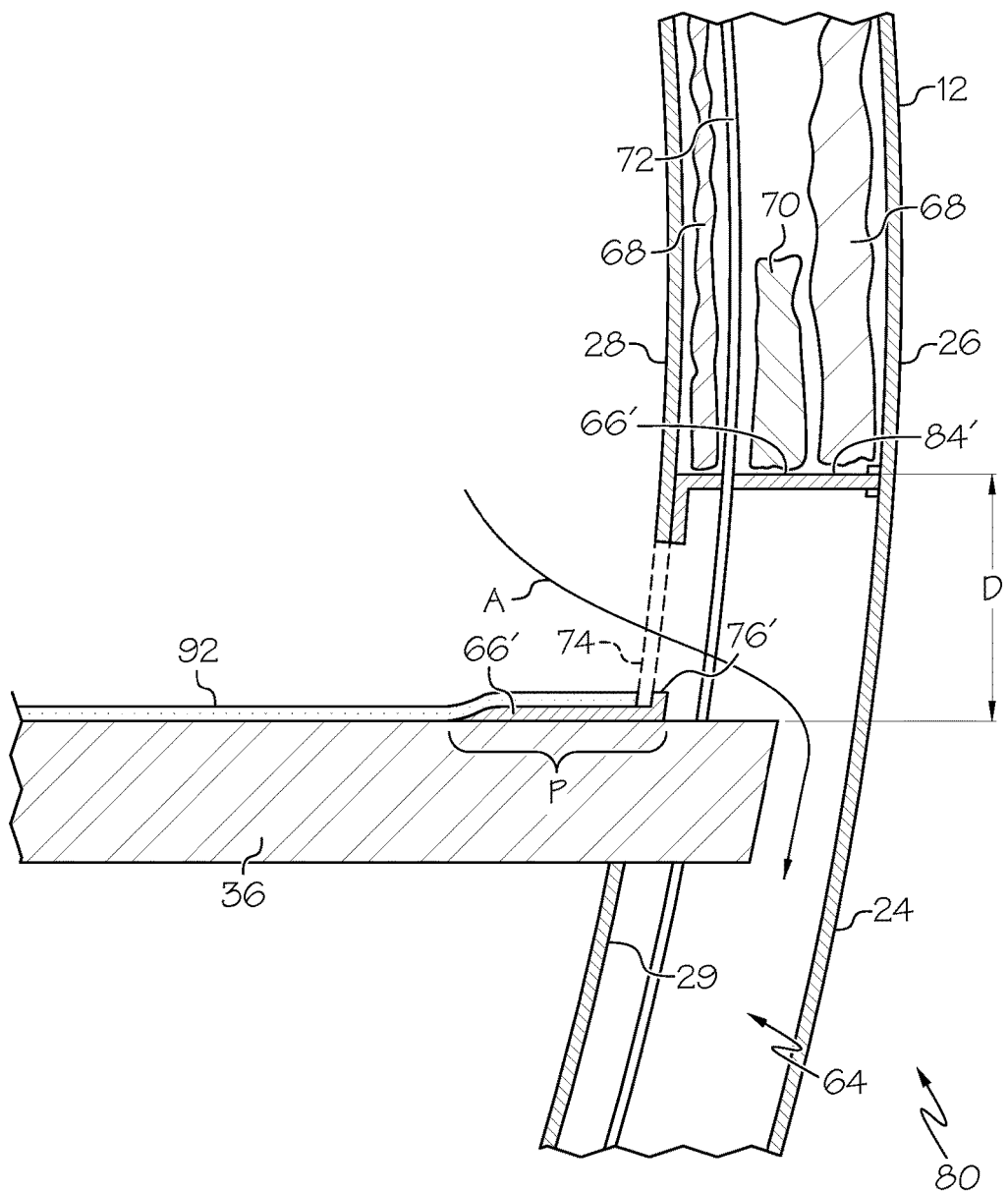
FIG. 4 is a detailed view of a portion of the fuselage of FIG. 2, showing a barrier sheeting member extending into the wall volume in accordance with an alternative embodiment of the present disclosure.

Referring to FIG. 4, in another embodiment, a barrier sheeting member 66' may be present only proximate the wall structure 24 (on both sides 78, 80 (FIG. 2) of the fuselage 12), rather than extending laterally across the floor beam 36. For example, the barrier sheeting member 66' may be laid over only a portion of the floor beam 36 (e.g., near the wall structure 24), and may include an end portion 84' that may extend into the wall volume 64 of the fuselage 12.

Inside the wall volume 64 of the wall structure 24, the barrier sheeting member 66' may extend from proximate (at or near) the inboard boundary 28 to proximate the outboard boundary 26, thereby effectively sealing the wall volume 64 to prevent sidewall air flow. To accommodate the return air grille 74, the end portion 84' of the barrier sheeting member 66' may be raised a distance D above the floor beam 36 to allow the opening 76' in the barrier sheeting member 66' to align with the return air grille 74. For example, the barrier sheeting member 66' may run horizontally along a portion P of the floor beam 36. Then, at the wall structure 24, the barrier sheeting member 66' may run from the floor beam 36, upward along the inside 29 (or, alternatively, the outside) of the inboard boundary 28 of the wall structure 24, and then laterally outward toward the outboard boundary 26 of the wall structure 24.

Like barrier sheeting member 66 described above, the barrier sheeting member 66' may axially extend along at least a portion of the longitudinal length L (FIG. 1) of the fuselage 12. For example, the barrier sheeting member 66' may continuously extend from proximate the forward end 86 (FIG. 1) of the fuselage 12 to proximate the aft end 88 (FIG. 1) of the fuselage 12. Alternatively, the barrier sheeting member 66' may axially extend as a plurality of segments.

A surface layer 92 may be placed over the portion P of the barrier sheeting member 66' lying on the floor beam 36. The surface layer 92 may protect the underlying barrier sheeting member 66' from wear and tear, and may also be decorative. For example, the surface layer 92 may be (or may include) carpet, laminate flooring, tile or the like.

While FIG. 4 only shows the second (e.g., starboard) side 80 of the fuselage 12, the barrier sheeting member 66' on the first (e.g., port) side 78 (see FIG. 2) may be configured in a similar manner as the barrier sheeting member 66' on the second (e.g., starboard) side 80. However, configuring one side 78, 80 differently than the other side 78, 80 is also contemplated and will not result in a departure from the scope of the present disclosure.

Various benefits may be achieved by incorporating the disclosed barrier sheeting members 66, 66' into the disclosed aircraft 10. For example, cabin ventilation effectiveness may be improved; heating of lower lobe 40 (e.g., cargo compartments 46) may be improved; ground cabin heat load may be reduced; the potential for cargo or EE bay smoke penetration into the passenger cabin may be reduced; cabin humidity may be improved by reducing condensation; and condensation on structure and other material in the wall structure 24 (and associated effects) may be reduced.

Figure 5:
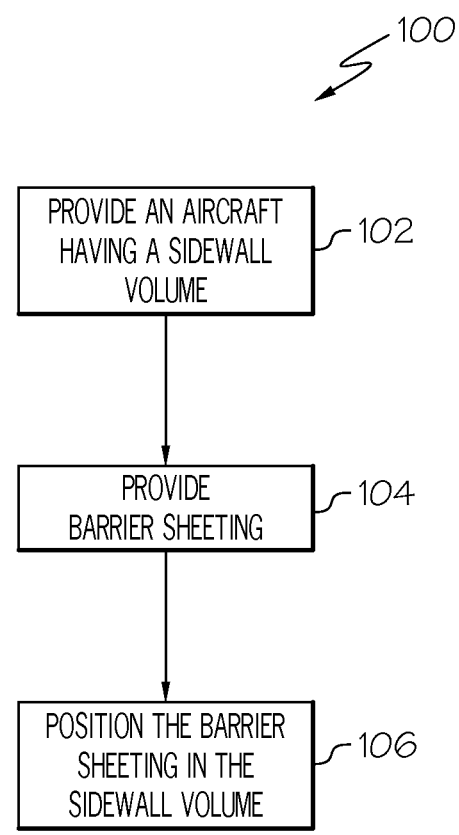
FIG. 5 is a flow chart depicting an embodiment of the disclosed method for reducing air flow in a wall volume.

Referring to FIG. 5, also disclosed is a method 100 for reducing air flow. The method 100 may be performed during the original manufacture of aircraft, as well as during repair, maintenance and/or retrofitting.

The method 100 may begin at Block 102 with the step of providing an aircraft. The aircraft may include a fuselage having a wall structure that includes an outboard boundary spaced apart from an inboard boundary to define a wall volume therebetween. Various wall volume components, such as insulation, fire barriers, transport elements and the like, may be housed in the wall volume.

At Block 104, a barrier sheeting member may be provided. In one implementation, the barrier sheeting member may be sized and shaped to extend both laterally across the fuselage (e.g., along the floor beam) and longitudinally along the fuselage. In another implementation, a first barrier sheeting member may be provided for the first (e.g., port) side of the aircraft and a second barrier sheeting member may be provided for the second (e.g., starboard) side of the aircraft. A third barrier sheeting member may be provided for the rear of the aircraft (e.g., proximate the aft pressure bulkhead).

At Block 106, the barrier sheeting member may be positioned to extend into the wall volume to reduce, if not eliminate, undesired air flow within the wall volume. The barrier sheeting member may be positioned such that it extends axially along at least a portion of the length of the fuselage at a substantially constant height (relative to the tarmac).

Figure 6:
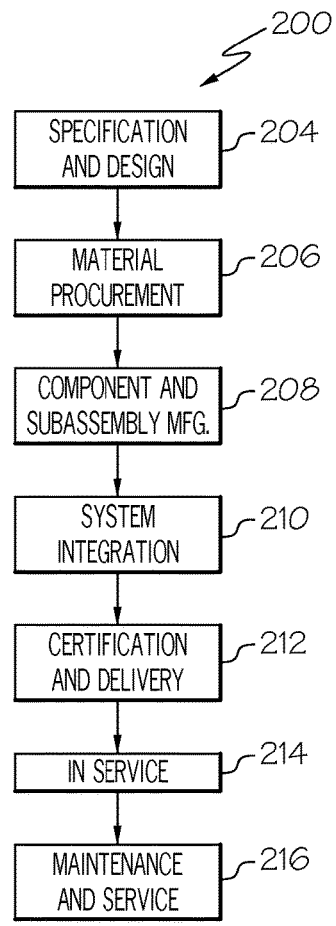
FIG. 6 is a flow diagram of an aircraft production and service methodology.
Figure 7:
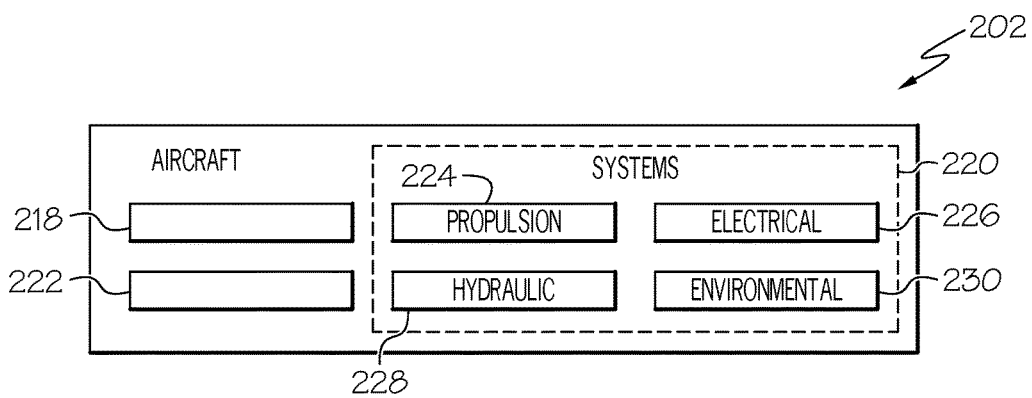
FIG. 7 is a block diagram of an aircraft.

Examples of the disclosure may be described in the context of an aircraft manufacturing and service method 200, as shown in FIG. 6, and an aircraft 202, as shown in FIG. 7. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. Although an aerospace example is shown, the principles of the disclosed aircraft 10 and method 100 may be applied to other industries, such as the automotive industry.

Apparatus and methods embodied herein may be employed during any one or more of the stages of the production and service method 200. For example, components or subassemblies corresponding to component/subassembly manufacturing 208, system integration 210, and or maintenance and service 216 may be fabricated or manufactured using the disclosed barrier sheeting member. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of apparatus examples, method examples, or a combination thereof may be utilized while the aircraft 202 is in service, for example and without limitation, to maintenance and service 216.

Although various embodiments of the disclosed structure and method for reducing air flow in a wall volume of an aircraft have been shown and described, modifications may occur to those skilled in the art upon reading the specification. The present application includes such modifications and is limited only by the scope of the claims.

What is claimed is:

1. An aircraft comprising:
    a fuselage defining an upper lobe and a lower lobe separated from said upper lobe by a floor beam, said fuselage comprising a wall structure that comprises:
        an outboard boundary; and
        an inboard boundary spaced from said outboard boundary,
        wherein said outboard boundary and said inboard boundary define a wall volume therebetween, and
        wherein said inboard boundary at least partially defines a passenger cabin, said passenger cabin being on a first side of said inboard boundary and said wall volume being on a second, opposite side of said inboard boundary;
    a barrier sheeting member extending along at least a portion of said floor beam and into said wall volume, said barrier sheeting member defining an opening therein, wherein said barrier sheeting member continuously extends from said inboard boundary to said outboard boundary, and is connected to said outboard boundary, to define a barrier in said wall volume that inhibits air flow within said wall volume between said upper lobe and said lower lobe; and
    a return air grille aligned with said opening to fluidly couple said passenger cabin with said lower lobe.

2. The aircraft of claim 1 wherein said barrier sheeting member is also connected to said inboard boundary.

3. The aircraft of claim 1 further comprising a surface layer, wherein said barrier sheeting member is positioned between said floor beam and said surface layer.

4. The aircraft of claim 1 wherein said fuselage comprises a first side and a second side laterally opposed from said first side, and wherein said barrier sheeting member extends from said wall volume on said first side to said wall volume on said second side.

5. The aircraft of claim 4 wherein said barrier sheeting member comprises a first end portion and a second end portion laterally opposed from said first end portion, and wherein said first end portion is connected proximate said outboard boundary on said first side of said fuselage and said second end portion is connection proximate said outboard boundary on said second side of said fuselage.

6. The aircraft of claim 5 wherein said first end portion and said second end portion are raised above said floor beam.

7. The aircraft of claim 1 wherein said barrier sheeting member extends horizontally along said floor beam, vertically upward along said inboard boundary, and laterally outward toward said outboard boundary.

8. The aircraft of claim 1 wherein said outboard boundary comprises at least one of a skin of said fuselage and an aft pressure bulkhead.

9. The aircraft of claim 1 wherein said inboard boundary comprises at least one of a passenger cabin sidewall and an aft cabin galley endwall.

10. The aircraft of claim 1 further comprising at least one of an insulation, a fire barrier and a transport element positioned in said wall volume.

11. The aircraft of claim 1 further comprising a transport element positioned in said wall volume, wherein said transport element extends through said barrier sheeting member.

12. The aircraft of claim 1 wherein said fuselage has a longitudinal length, and wherein said barrier sheeting member longitudinally extends along at least a portion of said longitudinal length.

13. The aircraft of claim 1 wherein said barrier sheeting member has a cross-sectional thickness ranging from about 1 mil to about 20 mils.

14. The aircraft of claim 1 wherein said barrier sheeting member comprises plastic sheeting.

15. The aircraft of claim 1 wherein said barrier sheeting member comprises a fiberglass reinforced phenolic laminate.

16. A method for reducing air flow in an aircraft, said aircraft comprising a fuselage defining an upper lobe and a lower lobe, wherein said upper lobe is separated from said lower lobe by a floor beam, said fuselage comprising a wall structure that comprises an outboard boundary and an inboard boundary spaced from said outboard boundary, wherein said outboard boundary and said inboard boundary define a wall volume therebetween, said method comprising steps of:

providing a barrier sheeting member; and positioning said barrier sheeting member such that a portion of said barrier sheeting member extends along at least a portion of said floor beam and an end portion of said barrier sheeting member extends into said wall volume and is connected to said outboard boundary to define a barrier in said wall volume continuously extending from said inboard boundary to said outboard boundary that inhibits air flow within said wall volume between said upper lobe and said lower lobe.

17. The method of claim 16 wherein said providing said barrier sheeting member comprises selecting plastic sheeting as said barrier sheeting member.

18. The method of claim 16 wherein said providing said barrier sheeting member comprises selecting a fiberglass reinforced phenolic laminate as said barrier sheeting member.

* * * * *